United States Patent
Hyon et al.

(10) Patent No.: US 7,894,389 B2
(45) Date of Patent: Feb. 22, 2011

(54) SYSTEM AND METHOD FOR TRANSMITTING AND RECEIVING RESOURCE ALLOCATION INFORMATION IN A WIRELESS COMMUNICATION SYSTEM

(75) Inventors: Tae-In Hyon, Hwaseong-si (KR); Ju-Yeop Kim, Anyang-si (KR); Dong-Ho Cho, Seoul (KR); Tae-Soo Kwon, Ansan-si (KR); Sik Choi, Daejeon (KR); O-Hyun Jo, Cheongju-si (KR); Ho-Won Lee, Chungju-si (KR)

(73) Assignees: Samsung Electronics Co., Ltd (KR); Korea Advanced Institute of Science & Technology (KAIST) (KR)

( * ) Notice: Subject to any disclaimer, the term of this patent is extended or adjusted under 35 U.S.C. 154(b) by 1027 days.

(21) Appl. No.: 11/705,991

(22) Filed: Feb. 14, 2007

(65) Prior Publication Data

US 2007/0211662 A1    Sep. 13, 2007

(30) Foreign Application Priority Data

Feb. 14, 2006    (KR) .................... 10-2006-0014253

(51) Int. Cl.
   *H04Q 7/00*    (2006.01)
   *H04Q 7/20*    (2006.01)
(52) U.S. Cl. ...................... 370/329; 455/450
(58) Field of Classification Search ......... 370/336, 370/328, 329, 341, 260, 267, 208; 455/450
See application file for complete search history.

(56) References Cited

U.S. PATENT DOCUMENTS

| | | |
|---|---|---|
| 2006/0007849 A1 | 1/2006 | Kim et al. |
| 2007/0076670 A1* | 4/2007 | Kuchibhotla et al. ........ 370/336 |
| 2007/0086370 A1* | 4/2007 | Jang et al. .................. 370/318 |

FOREIGN PATENT DOCUMENTS

| | | |
|---|---|---|
| EP | 1 575 205 A2 | 9/2005 |
| WO | WO 01/82544 A2 | 11/2001 |

OTHER PUBLICATIONS

Ying et al., Two-Dimensional Resource Allocation for OFDM/TDMA Microcellular Networks, 2004 Vehicular Technology Conference, Sep. 26, 2004, pp. 3452-3456.

* cited by examiner

*Primary Examiner*—George Eng
*Assistant Examiner*—Khawar Iqbal
(74) *Attorney, Agent, or Firm*—The Farrell Law Firm, P.C.

(57) ABSTRACT

A system and method for transmitting resource allocation information in a wireless communication system is provided. A transmitter transmits resource allocation information mapped to a current time interval in a first region to a receiver, and transmits resource allocation information mapped to a next time interval in a second region. When receiving the resource allocation information of the second region, the receiver notifies the transmitter whether the resource allocation information has been received. The transmitter receives notification that the resource allocation information of the second region has been received and transmits resource allocation information mapped to a subsequent time interval in the second region.

15 Claims, 6 Drawing Sheets

SYSTEM AND METHOD FOR TRANSMITTING AND RECEIVING RESOURCE ALLOCATION INFORMATION IN A WIRELESS COMMUNICATION SYSTEM

PRIORITY

This application claims priority under 35 U.S.C. §119 to an application entitled "System and Method for Transmitting and Receiving Resource Allocation Information in a Wireless Communication System" filed in the Korean Intellectual Property Office on Feb. 14, 2006 and assigned Serial No. 2006-14253, the contents of which are incorporated herein by reference.

BACKGROUND OF THE INVENTION

1. Field of the Invention

The present invention generally relates to a communication system, and more particularly to a system and method for transmitting resource allocation information in a wireless communication system.

2. Description of the Related Art

Extensive research is being conducted to provide users with high-speed services based on various Qualities of Service (QoSs) in fourth-generation (4G) communication systems serving as next-generation communication systems. Specifically, active research is being conducted to support high-speed services for ensuring mobility and QoS in Broadband Wireless Access (BWA) communication systems such as Wireless Local Area Network (WLAN) and Metropolitan Area Network (MAN) communication systems in the current 4G-communication systems.

A transmitter and receivers of the above-described wireless communication system, i.e., a Base Station (BS) and Mobile Station (MS), employ a frame structure to exchange data. When the communication system employs the frame structure for a data transmission between the transmitter and the receiver, i.e., the BS and the MS, the BS efficiently allocates resources of frames to the MS such that they can use the resources. Resource allocation information is sent to the MS through a MAP message. Herein, a MAP message for transmitting downlink (DL) resource allocation information is a DL-MAP message and a MAP message for transmitting uplink (UL) resource allocation information is a UL-MAP message.

When the BS transmits DL and UL resource allocation information in the DL and UL MAP messages, the MSs decode the DL and UL MAP messages transmitted from the BS, such that they can detect positions of their own allocated resources and control information on their own received data. The MSs can receive or transmit data through a DL or UL by detecting the resource allocation positions and the control information.

FIG. 1 illustrates the resource domain of the conventional wireless communication system.

Referring to FIG. 1, the resource domain includes MAP messages for transmitting resource allocation information and data mapped to the MAP messages. A first MAP message includes resource allocation information mapped to first data, a second MAP message includes resource allocation information mapped to second data, and a third MAP message includes resource allocation information mapped to third data.

The BS transmits MAP messages containing resource allocation information and allocated resources together. When receiving the MAP message, the MS decodes the MAP message and detects positions of its own allocated resources and control information, thereby receiving its own allocated data.

FIG. 2 illustrates a resource allocation information transmission/reception in the conventional wireless communication system.

As illustrated in FIG. 2, a plurality of resource allocation information regions are, for example, a first MAP message 200, a second MAP message 230, and a third MAP message 260, and a plurality of data, namely, first data 210, second data 240, and third data 270 mapped to the MAP messages included in the resource allocation information regions. When the BS transmits MAP information mapped to the data 210, 240, 270 using the first, second, and third MAP messages 200, 230, and 260, the MS decode the MAP messages 200, 230, and 260 and detect MAP Information Elements (IEs) corresponding to information about their own allocated resources, thereby detecting their own allocated regions.

Herein, the IEs included in the MAP messages include their start points and sizes of regions allocated for the MS in time and frequency domains. When receiving the MAP messages, the MS decode the MAP messages and detect IEs, i.e., MAP IEs, indicative of information about their own allocated resources, thereby detecting positions of their own allocated resources.

When the MS detect their own allocated MAP IEs while sequentially decoding the MAP IEs included in the MAP messages, they learn positions of their own allocated resources using position information of the detected MAP IEs.

When receiving the MAP messages 200, 230, and 260 from the BS, the MS sequentially decodes the received first MAP message 200 and detects a MAP IE included in the first MAP message 200. The MS learns a position of its own allocated resources, i.e., a position of the first data 210, using position information of the detected MAP IE. Then, the MS receives the first data 210 allocated thereto.

When receiving the second MAP message 230 subsequent to the first MAP message 210 from the BS, the MS sequentially decodes the received second MAP message 230 and detects a MAP IE included in the second MAP message 230. The MS learns a position of its own allocated resources, i.e., a position of the second data 240, using position information of the detected MAP IE. Herein, the MS receives the second data 240 allocated thereto.

When receiving the third MAP message 260 subsequent to the first and second MAP messages 210 and 230 from the BS, the MS sequentially decodes the received third MAP message 260 and detects a MAP IE included in the third MAP message 260. The MS learns a position of its own allocated resources, i.e., a position of the third data 270, using position information of the detected MAP IE. Herein, the MS receives its own allocated third data 270.

As described above, the BS transmits resource allocation information through the first, second and third MAP messages 200, 230, and 260, and transmits data allocated to the MS using the MAP messages. Each MS decodes a MAP message and receives its own allocated data.

The BS transmits resource allocation information to all MSs for receiving a service from the BS in a frame. Thus, the resource allocation information is broadcast to the MS located within a cell of the BS. It is important that the MS receive the resource allocation information because the BS and the MS transmit and receive data using the resource allocation information. However, the current wireless communication system is sensitive to interference, multipath fading and thermal noise due to characteristics of a radio channel in which data is sent. When the resource allocation information, i.e., the MAP message, which is more robust than data is sent, a Modulation and Coding Scheme (MCS) at a low transmission rate according to channel characteristics is used. Specifically, when the MAP message is sent, the MCS is used at a low transmission rate like Quadrature Phase Shift Keying (QPSK) $\frac{1}{12}$ or $\frac{1}{8}$. When data is sent at the low transmission rate, error in a data transmission and reception is reduced. The reliability of a MAP message transmission and reception relative to MS within a cell increases.

However, the resource allocation information such as the MAP message is a type of overhead information for transmitting data from the BS to the MS. When the MAP message is sent through the MCS at a low rate, a waste of resources occurs.

The MAP messages corresponding to the resource allocation information of the wireless communication system are broadcast to all MS located in a cell covered by the BS. Hence, a problem occurs in that the MAP message size increases and the throughput of the overall system is degraded according to MAP message size when the number of MS increases.

SUMMARY OF THE INVENTION

It is, therefore, an object of the present invention to provide a system and method for transmitting and receiving resource allocation information that can reduce the overhead according to the resource allocation information is sent and received in a wireless communication system.

It is another object of the present invention to provide a system and method for transmitting and receiving resource allocation information that can reduce the overhead due to the use of unnecessary resources according to the resource allocation information is sent and received in a wireless communication system.

In accordance with the present invention, there is provided a method for transmitting resource allocation information in a wireless communication system, including transmitting resource allocation information mapped to a current time interval in a first region to a receiver, and transmitting resource allocation information mapped to a next time interval in a second region; and receiving, notification that the resource allocation information of the second region has been received and transmitting resource allocation information mapped to a subsequent time interval in the second region.

In accordance with the present invention, there is provided a method for receiving resource allocation information in a wireless communication system, including receiving resource allocation information mapped to a current time interval in a first region from a transmitter; and notifying the transmitter whether the resource allocation information has been received when the receiver has received the resource allocation information of the second portion through the resource allocation information in the first region.

In accordance with the present invention, there is provided a system for transmitting resource allocation information in a wireless communication system, including a transmitter for transmitting resource allocation information mapped to a current time interval in a first region, transmitting resource allocation information mapped to a next time interval in a second region, receiving notification that the resource allocation information of the second region has been successfully received from a receiver, and transmitting resource allocation information mapped to a subsequent time interval in the second region.

In accordance with the present invention, there is provided a system for receiving resource allocation information in a wireless communication system, including a receiver for receiving resource allocation information mapped to a current time interval in a first region from a transmitter; and notifying the transmitter whether the resource allocation information has been received when the receiver has received the resource allocation information of the second portion through the resource allocation information in the first region.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for the sake of clarity and conciseness.

In the present invention, a Base Station (BS) corresponding to a transmitter broadcasts resource allocation information to a Mobile Station (MS) or a Mobile Subscriber Station (MSS) corresponding to a receiver. The BS transmits the resource allocation information of each MS in a resource allocation information transmission region in an initial transmission time. In a data region mapped to the resource allocation information, data to be transmitted to an associated MS and the next time resource allocation information are sent together. When receiving the information and the data, the MS notifies the BS that the resource allocation information has been successfully received. Then, the BS transmits subsequent resource allocation information in the data transmission region to each MS until the resource allocation information is not received in the normal fashion.

When the next time resource allocation information is not successfully received, the BS again transmits it in the resource allocation information transmission region as in the initial transmission time. In the present invention, a method for transmitting and receiving resource allocation information, i.e., a MAP, considers a channel environment between a BS and an MS such that the average transmission rate of the overall system increases.

Figure 1:
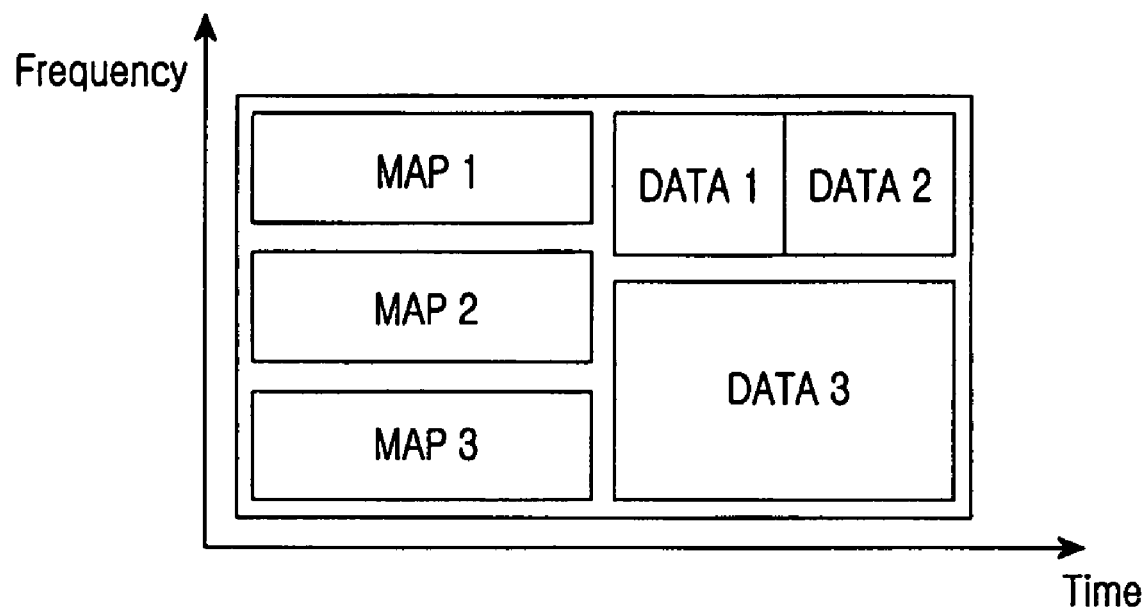
FIG. 1 illustrates a resource domain of a conventional wireless communication system.
Figure 2:
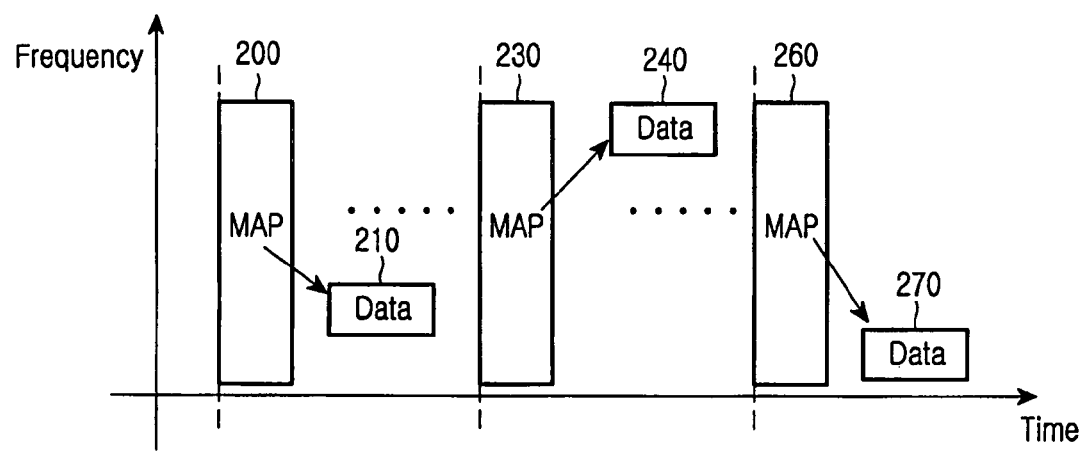
FIG. 2 illustrates a resource allocation information transmission/reception in the conventional wireless communication system.
Figure 3:
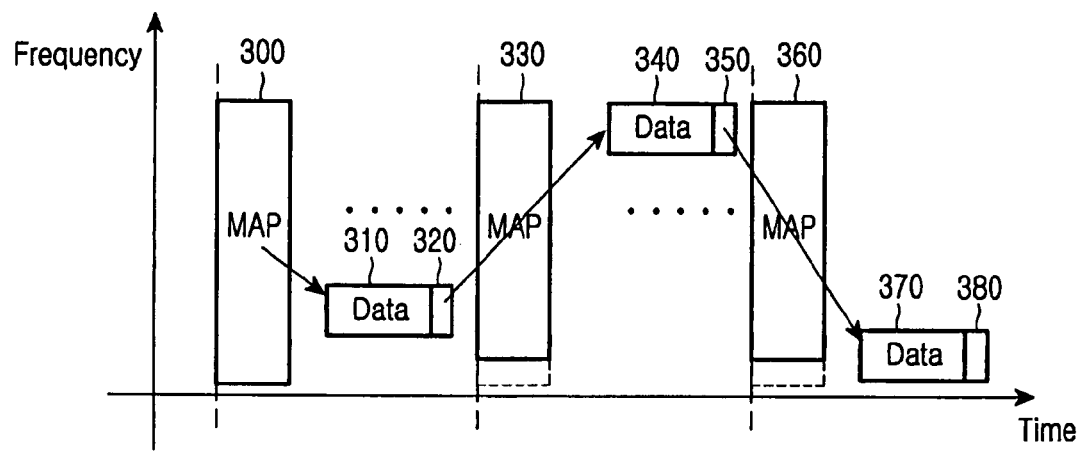
FIG. 3 illustrates a resource allocation information transmission/reception in a wireless communication system in accordance with the present invention.

FIG. 3 illustrates a resource allocation information transmission/reception in a wireless communication system in accordance with the present invention.

As illustrated in FIG. 3, there are a plurality of resource allocation information regions, e.g., a first MAP message 300, a second MAP message 330, and a third MAP message 360, and first data 310, second data 340 and third data 370.

A wireless communication system including a BS and one MS for communicating with the BS within its cell will be described. For the sake of convenience, an operation between the BS and the MS is described. However, the present invention can also be applied in the case where the BS communicates with other MSs within the cell.

According to the prior art, the BS includes and transmits resource allocation information in the MAP message and each MS decodes the MAP message and receives data by detecting a position of its own allocated resources and control information mapped to the data to be received. In accordance with the present invention, the BS transmits the first MAP message 300 and the MS detects its own allocated MP IE when receiving the first MAP message 300 and detects its own allocated resource allocation information, i.e., a position of its own allocated data and control information mapped to the data to be received, from the MAP IE.

The MS receives its own allocated resources, i.e., the first data 310, using the detected resource allocation information. Herein, the BS includes or combines first resource allocation information 320 mapped to the next time data in the first data 310 when the first data 310 is sent. When it is assumed that the next time data to be sent is the second data 340, the first resource allocation information 320 is resource allocation information to be used to recover the second data 340 in the MS. The first resource allocation information 320 for recovering the second data 340 is not sent in the second MAP message 330, but is sent together with the first data 310. The first resource allocation information 320 is a type of MAP message for the MS.

The BS transmits the first data 310 while considering a channel state of the MS. This consideration is made because the reliability of the resource allocation information transmission and the average transmission rate can both increase, when the first resource allocation information 320 is sent to the MS for which the channel state is good through the above-described method.

The BS determines whether the channel state of the MS is good by acquiring channel quality information relative to the MS and determining whether a value of the acquired channel quality information exceeds that of preset reference channel quality information. When determining that the channel state is good because the value of the channel quality information relative to the MS exceeds that of the preset reference channel quality information, the BS transmits the first resource allocation information 320 and the first data 310 in a general data transmission region. The channel quality information can be, for example, a Carrier to Interference and Noise Ratio (CINR) or a Signal to Noise Ratio (SNR).

When successfully receiving the first resource allocation information 320, the BS transmits an ACKnowledge (ACK) message indicating that the first resource allocation information 320 has been successfully received without error. When the first resource allocation information 320 has not been successfully received, the BS transmits a Negative ACK (NACK) message. If the BS has received the ACK message, then the associated MS has successfully received the first resource allocation information 320. The BS transmits the second data 340 without transmitting the first resource allocation information 320 in the second MAP message 330 at the next time. As when the first data 310 is sent, second resource allocation information 350 corresponding to resource allocation information for recovering the third data 370 is combined/included and sent in the second data 340.

As when the first data 310 is sent, the BS transmits the second resource allocation information 350 while considering channel quality information relative to the MS. The BS transmits the second resource allocation information 350 combined with the second data 340 without transmitting the resource allocation information 350 in the second MAP message 330. A size of the second MAP message 330 is smaller than that of the existing MAP message.

Next, when successfully receiving the second resource allocation information 350, the MS transmits the ACK message to the BS. When receiving the ACK message, the BS combines or includes the third resource allocation information 380 in the third data 370, such that the third resource allocation information 380 is transmitted together with the third data 370. As described above, the BS transmits the third resource allocation information 380 while considering channel quality information. A size of the third MAP message 360 is smaller than that of the existing MAP message.

When receiving the NACK message from the MS or the channel state is poor, the BS does not transmit resource allocation information in the data transmission region, but includes and transmits the resource allocation information in the resource allocation information transmission region, i.e., the MAP message.

Figure 4:
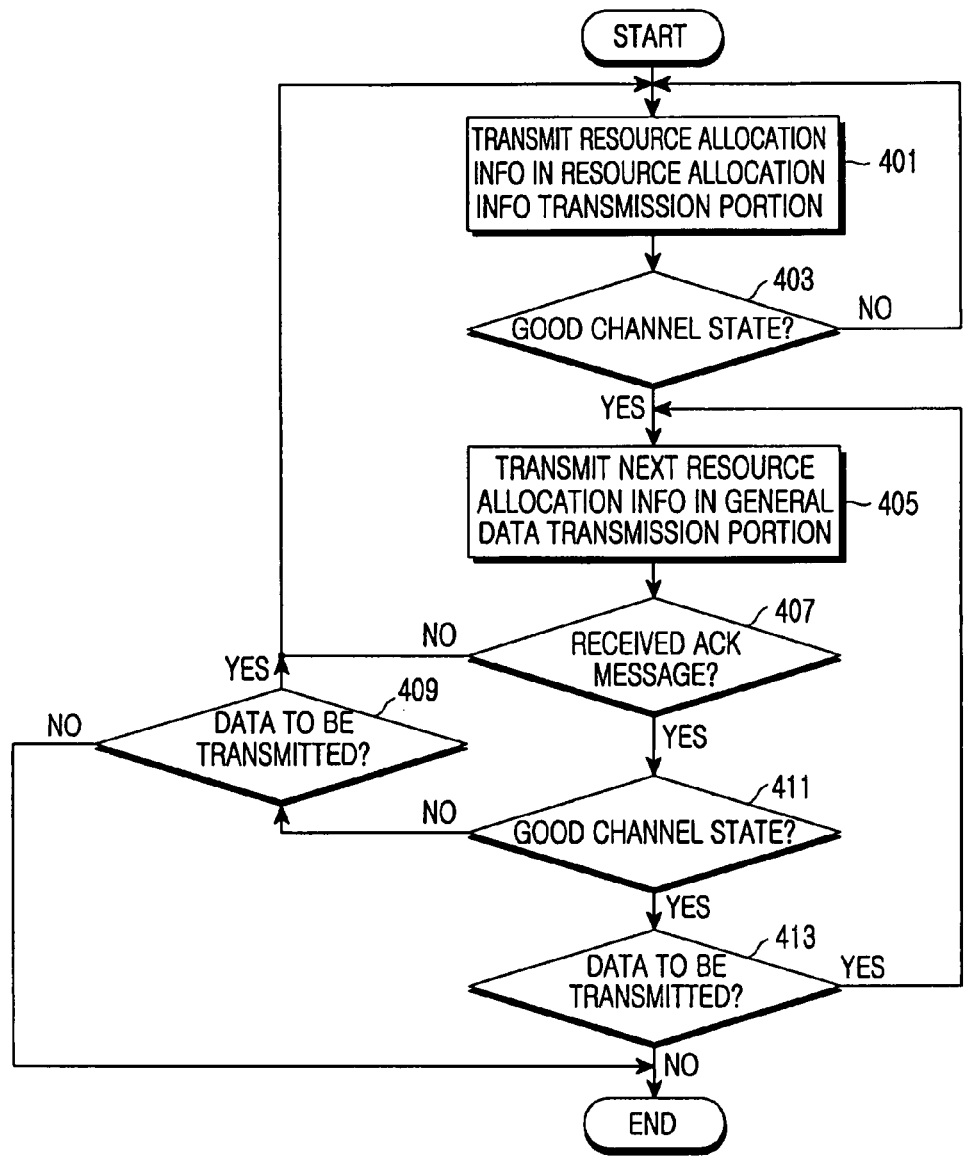
FIG. 4 is a flowchart illustrating an operation of a transmitter of the wireless communication system in accordance with the present invention.

FIG. 4 is a flowchart illustrating an operation of a transmitter of the wireless communication system in accordance with the present invention.

Referring to FIG. 4, a BS transmits resource allocation information in a resource allocation information transmission region, i.e., a MAP message, to an MS in step 401 and then proceeds to step 403. The BS transmits information about a position of resources allocated to the MS and resource allocation information mapped to data to be received by the MS in the MAP message. The BS transmits the data mapped to the resource allocation information and resource allocation information mapped to the next time data together.

In step 403, the BS determines whether a channel state is good by receiving channel quality information relative to the MS and determining whether a value of the received channel quality information is equal to or more than that of preset reference channel quality information. When determining that the value of the received channel quality information is less than that of the preset reference channel quality information, the BS determines that the channel state is poor. When determining that the channel state is poor in step 403, the BS proceeds to step 401. If the channel state relative to the MS is poor, the BS transmits the resource allocation information in a MAP message because the MS does not correctly receive the resource allocation information in a data region.

However, the BS proceeds to step 405 when determining that the channel state is good. The BS transmits data and the next time resource allocation information in the data transmission region in step 405 and then proceeds to step 407.

In step 407, the BS determines whether an ACK message has been received from the MS. When determining that the ACK message has not been received from the MS, i.e., a NACK message has been received, the BS proceeds to step 401. When determining that the ACK message has been received, the BS proceeds to step 411.

In step 411, the BS determines whether the channel state is good using, for example, channel quality information. If the channel state is good, the BS proceeds to step 413.

In step 413, the BS determines whether data to be sent to the MS is present. If not present, then the BS ends the operation for transmitting the resource allocation information. However, the BS proceeds to step 405 when determining that the data to be sent to the MS is present.

When determining that the channel state is poor, the BS proceeds to step 409 where the BS determines whether data to be sent to the MS is present. If not present, then the BS ends the operation for transmitting the resource allocation information. However, the BS proceeds to step 401 when determining that the data to be sent to the MS is present.

When the channel state is poor, the BS transmits the resource allocation information in the resource allocation information transmission region, i.e., the MAP message. When the channel state is good, the BS combines or includes a resource allocation information message in the general data region. As described above, the BS schedules in advance the next time resource allocation information and transmits in advance the next time resource allocation information in the data region of the current frame.

Figure 5:
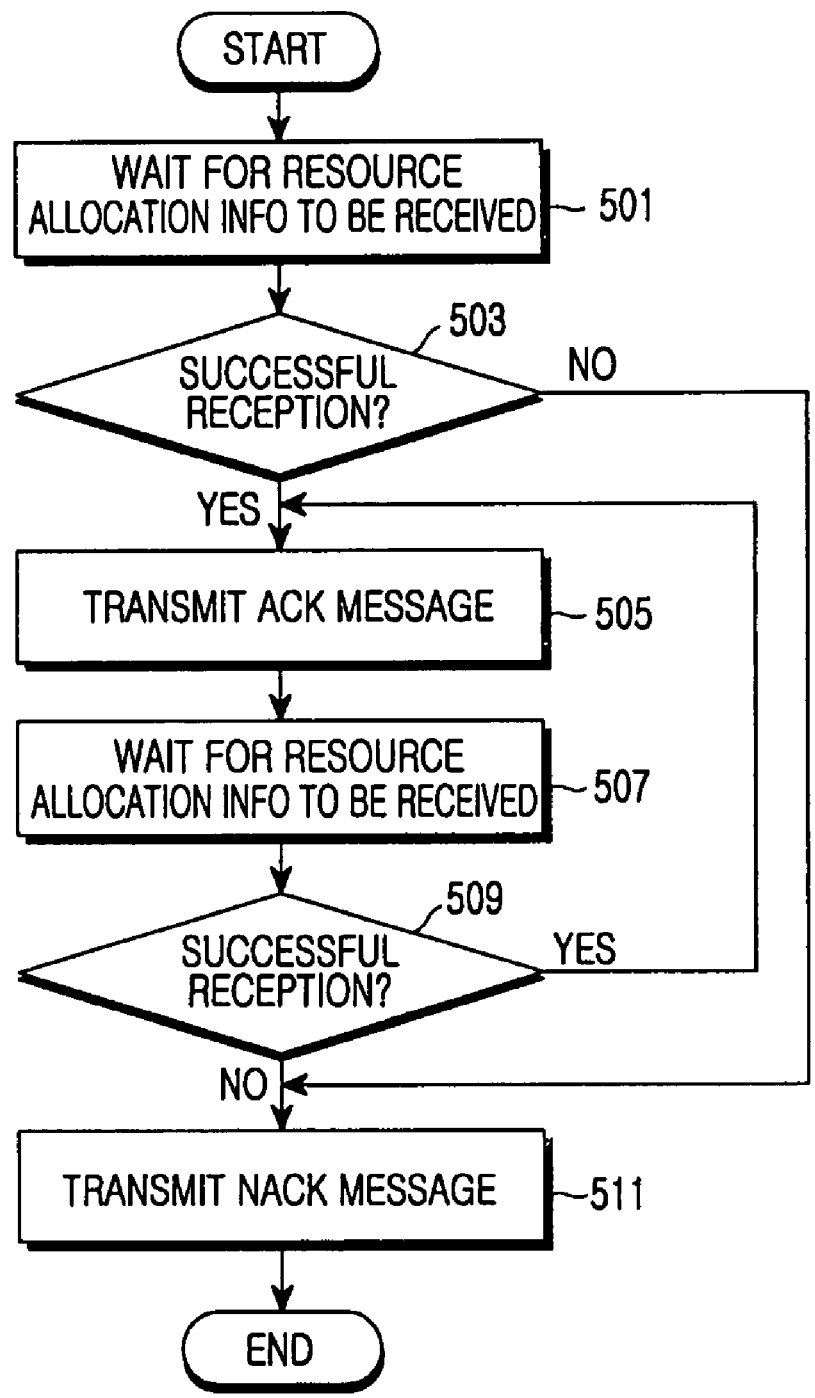
FIG. 5 is a flowchart illustrating an operation of a receiver of the wireless communication system in accordance with the present invention.

FIG. 5 is a flowchart illustrating an operation of a receiver of the wireless communication system in accordance with the present invention.

Referring to FIG. 5, an MS waits for resource allocation information to be received in a data region from a BS in step 501, and then proceeds to step 503. In an initial transmission time, the MS receives resource allocation information in a resource allocation information transmission region, i.e., a MAP message, from the BS, decodes the MAP message, and receives the resource allocation information, i.e., control information for identifying a data position and recovering data. The MS recovers the data using the resource allocation information, and waits for the next time resource allocation information included or combined in the data region.

In step 503, the MS determines whether the resource allocation information has been successfully received in the data region. When determining that the resource allocation information has been successfully received, the MS proceeds to step 505.

The MS transmits an ACK message to the BS in step 505 and then proceeds to step 507. When receiving the ACK message, the BS transmits data of the MS and the resource allocation information in the data transmission region.

Unless the resource allocation information has been successfully received, the MS proceeds to step 511 to transmit a NACK message indicating that error has occurred in the resource allocation information transmission to the BS.

When the MS waits for resource allocation information to be received in step 507, the MS proceeds to step 509. The MS waits for the resource allocation information sent in the data region to be recovered using the resource allocation information received in step 503. When determining that the resource allocation information has been successfully received in step 509, the MS proceeds to step 505.

Unless the resource allocation information has been successfully received in step 509, the MS proceeds to step 511 to transmit the NACK message indicating that error has occurred in the resource allocation information transmission to the BS.

When successfully receiving the resource allocation information in the data region, the MS can receive, from the BS, subsequent resource allocation information and data in the data region rather than the MAP region. Because the resource allocation information is not received in the MAP region using a Modulation and Coding Scheme (MCS) at a low transmission rate, a MAP size decreases.

When the above-described method is employed, radio resources can be efficiently employed. The MS measures channel quality information and determines whether its channel quality information is good. The MS can determine whether to receive the resource allocation information in the resource allocation information region or in the data region and can notify the BS of a determination result.

Figure 6:
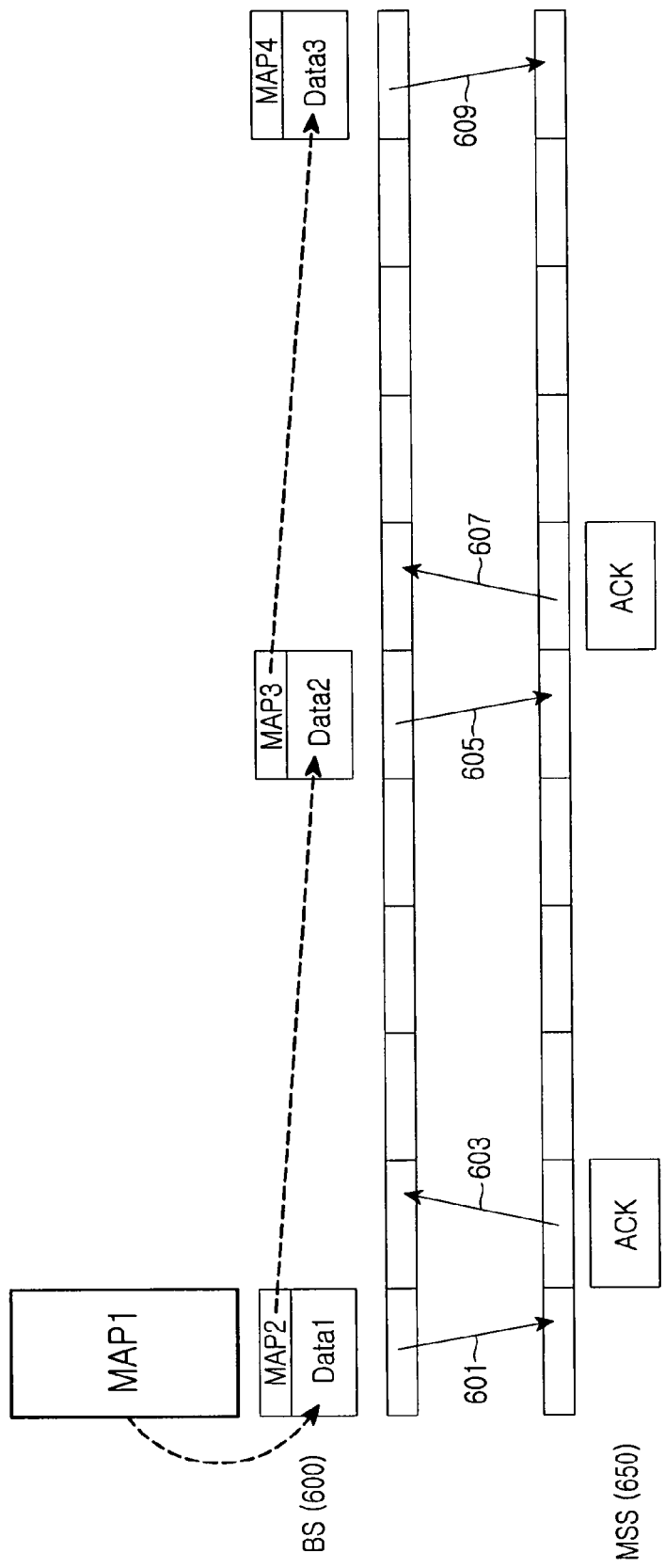
FIG. 6 illustrates an operation for transmitting and receiving resource allocation information in the wireless communication system in accordance with the present invention.

FIG. 6 illustrates the operation for transmitting and receiving resource allocation information in the wireless communication system in accordance with the present invention. Specifically, FIG. 6 illustrates a BS 600, an MS 650, and messages sent and received between the BS 600 and the MS 650.

The BS 600 transmits resource allocation information in a first MAP message that includes the resource allocation information for recovering first data. The BS 600 transmits, to the MS 650, resource allocation information for recovering second data to be sent in a second MAP message, and the first data together. The BS 600 transmits, to the MS 650, the second MAP message combined or included in the first data. The BS 600 transmits the first MAP message in a MAP region, i.e., a resource allocation information transmission region, and transmits the first data and the second MAP message in a data transmission region (Step 601). The second MAP message is the next time resource allocation information for recovering the second data. For the sake of convenience, the next time resource allocation information is referred to as the second MAP message. As described below, subsequent resource allocation information to be included and sent in the data region is referred to as third and fourth MAP messages.

When successfully receiving the second MAP message, the MS 650 transmits an ACK message to the BS 600 (Step 603). The second MAP message is resource allocation information for recovering the second data. When receiving the ACK message, the BS 600 does not include and transmit the second MAP message, in the MAP region.

When receiving the ACK message, the BS 600 transmits, to the MS 650, resource allocation information for recovering third data to be sent in the third MAP message and the second data (Step 605). The third MAP message corresponding to the resource allocation information for recovering the third data is combined or included in the second data and is sent to the MS.

At this time, the MS 650 can recover the second data using the second MAP message and can receive the third MAP message sent together with the second data. When successfully receiving the resource allocation information, the MS 650 transmits the ACK message to the BS 600 (Step 607).

When receiving the ACK message, the BS 600 transmits the third data mapped to the third MAP message and then transmits, to the MS 650, the fourth MAP message for recovering data to be sent to the MS 650 and the third data together (Step 609).

In an initial transmission time, the BS 600 and the MS 650 transmit data using the MAP message transmission region. Subsequent resource allocation information for data recovery is sent together with data in the data region. A MAP message is conventionally sent in every frame. However, the present invention can decrease a size of the MAP message. A waste of resources due to a MAP message transmission corresponding to a type of control overhead can be prevented.

Figure 7:
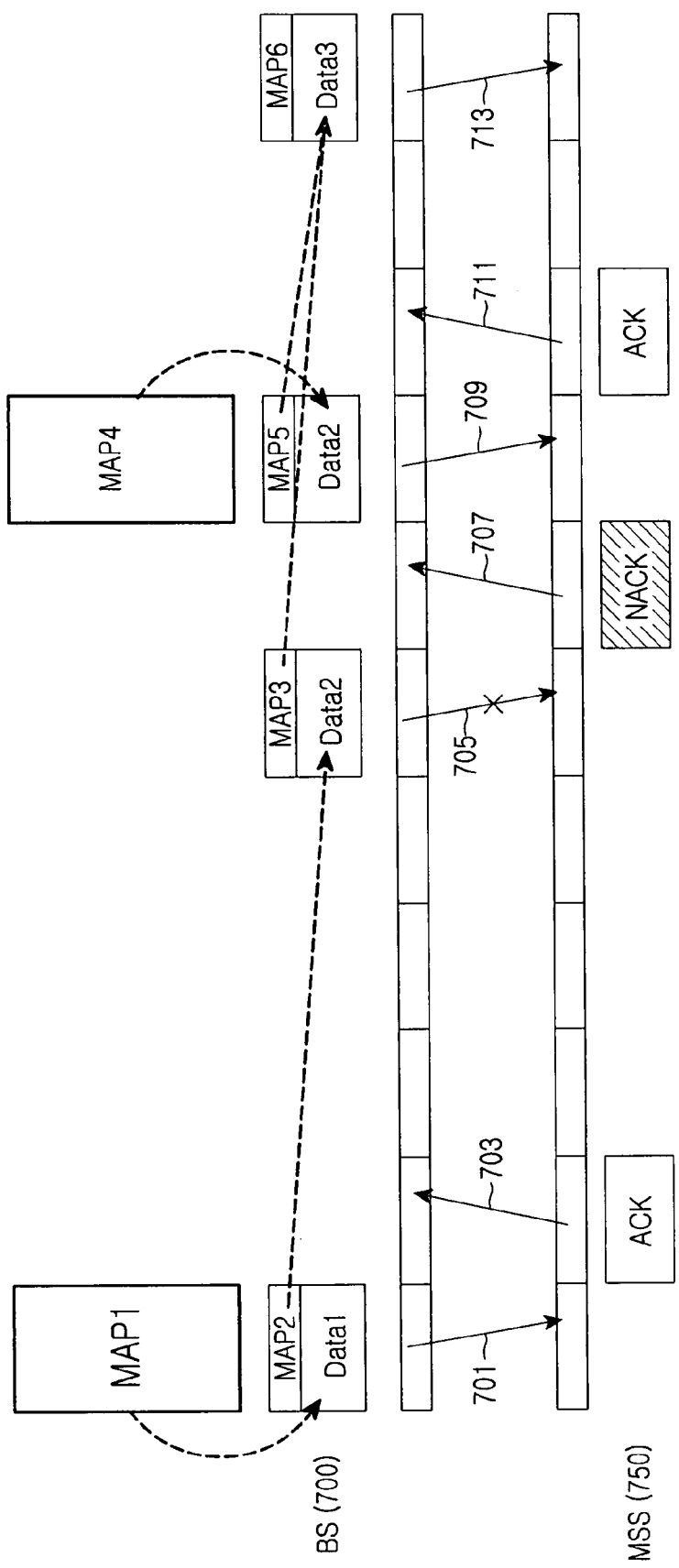
FIG. 7 illustrates an operation for transmitting and receiving resource allocation information when error occurs in a resource allocation information reception of the wireless communication system in accordance with the present invention.

FIG. 7 illustrates an operation for transmitting and receiving resource allocation information when error occurs in a resource allocation information reception of the wireless communication system in accordance with the present invention. Specifically, FIG. 7 illustrates a BS 700, an MS 750, and messages sent and received between the BS 700 and the MS 750.

The BS 700 transmits resource allocation information in a first MAP message that includes the resource allocation information for recovering first data. The BS 700 transmits, to the MS 750, resource allocation information for recovering second data to be sent in a second MAP message and the first data. The BS 700 transmits, to the MS 750, the second MAP message combined or included in the first data. The BS 700 transmits the first MAP message in a MAP region, i.e., a resource allocation information transmission region, and transmits the first data and the second MAP message in a data transmission region (Step 701). The second MAP message is the next time resource allocation information for recovering the second data. For the sake of convenience, the next time resource allocation information is referred to as the second MAP message. As described below, subsequent resource allocation information to be included and sent in the data region is referred to as third, fourth, and fifth MAP messages.

When successfully receiving the second MAP message, the MS 750 transmits an ACK message to the BS 700 (Step 703). The second MAP message is resource allocation information for recovering the second data. When receiving the ACK message, the BS 700 does not include and transmit the second MAP message in the MAP region.

When receiving the ACK message, the BS 700 transmits, to the MS 750, resource allocation information for recovering third data to be sent in the third MAP message, and the second data together (Step 705). The third MAP message corresponding to the resource allocation information for recovering the third data is combined or included in the second data and is sent to the MS.

At this time, the MS 750 can recover the second data using the second MAP message and can receive the third MAP message sent together with the second data. When the resource allocation information has not been successfully received, the MS 750 transmits a NACK message to the BS 700 (Step 707).

The BS 700 again transmits the resource allocation information for recovering the second data, in the fourth MAP message, and transmits, to the MS 750, the second data in which a reception error has occurred and resource allocation information for recovering the third data to be sent in the third MAP message (Step 709).

When successfully receiving the third MAP message, the MS 750 transmits the ACK message to the BS 700 (Step 711).

When receiving the ACK message, the BS 700 transmits the third data mapped to the third MAP message and then transmits, to the MS 750, the fifth MAP message for recovering the next time data and the third data (Step 713).

The first MAP message of FIG. 6 and the first and fourth MAP messages of FIG. 7 are broadcast to MSs within a cell at a low transmission rate for a reliable transmission. However, the present invention can reduce the consumption of radio resources by transmitting data and a MAP message, except for the case where an initial transmission is performed or error occurs in a message transmission/reception. When users of good channel resources employ the above-described transmission method, the efficiency of resource use is improved.

A data region is less robust than a resource allocation information transmission region. However, the present invention can effectively save resources by transmitting the data region at a higher transmission rate than that of the resource allocation information transmission region. On the basis of a successful transmission and reception of resource allocation information in accordance with the present invention, ACK and NACK messages are sent in a Hybrid Automatic Request (HARQ) scheme, such that fast feedback can be performed. As the HARQ scheme is employed, the reliability of a resource allocation information transmission can be significantly increased. Specifically, when the HARQ scheme is applied for a message whose packet is small and periodically arrives as in a Voice over Internet Protocol (VoIP) service, gain can be maximized.

As described above, the present invention can reduce the overhead in a resource allocation transmission/reception by transmitting resource allocation information in a general data region when the resource allocation information is sent in a wireless communication system. The present invention can improve the performance of an overall system by transmitting the resource allocation information in the general data region at a high data transmission rate. The present invention can increase the average transmission rate by transmitting the resource allocation information while considering a channel state when the resource allocation information is sent and received.

Although the preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for transmitting resource allocation information by a transmitter in a wireless communication system, the method comprising the steps of:

transmitting a MAP massage including first resource allocation information mapped to a current time interval, the first resource allocation information identifying resources that the transmitter will use to transmit first data to a receiver during the current time interval through a resource allocation information transmission region;

transmitting the first data and second resource allocation information mapped to a next time interval through a data transmission region, the second resource allocation information identifying resources that the transmitter will use to transmit second data to the receiver through the data transmission region during the next time interval;

determining if an acknowledgment has been received from the receiver, the acknowledgment indicating that the receiver been received the second resource allocation information; and when the acknowledgement has been received, transmitting, using the resources identified by the second resource allocation information, the second data and third resource allocation information mapped to a subsequent time interval, the third resource allocation information identifying resources that the transmitter will use to transmit third data to the receiver during the subsequent time interval.

2. The method of claim 1, further comprising:

transmitting the second resource allocation information through the data transmission region to the receiver when a value of channel quality information between the transmitter and the receiver is greater than or equal to that of reference channel quality information.

3. The method of claim 1, wherein, when the acknowledgement has been not received, the transmitter transmits the second resource allocation information through the data transmission region.

4. The method of claim 1, further comprising:
when the acknowledgement has not been received from the receiver, transmitting a second MAP message including the second resource allocation information of the data transmission region through the resource allocation information transmission region, the second MAP message being transmitted using next available resources reserved for data resource allocation notification; and
transmitting, using the resources identified by the second resource allocation information, the second data and the third resource allocation information mapped to the subsequent time interval through the data transmission region.

5. A method for receiving resource allocation information, by a receiver in a wireless communication system, the method comprising the steps of:
receiving a MAP massage including first resource allocation information mapped to a current time interval, the first resource allocation information identifying resources that a transmitter will use to transmit first data to the receiver during the current time interval through a resource allocation information transmission region;
receiving the first data and second resource allocation information mapped to a next time interval through a data transmission, the second resource allocation information identifying resources that the transmitter will use to transmit second data to the receiver during the next time interval;
determining if the second resource allocation information has been successfully received; and
when the second resource allocation information has been successfully received, sending an acknowledgement to the transmitter, and receiving, using the resources identified by the second resource allocation information, the second data and third resource allocation information mapped to a subsequent time interval, the third resource allocation information identifying resources that the transmitter will use to transmit third data to the receiver in the subsequent time interval.

6. The method of claim 5, further comprising:
when the second resource allocation information has not been successfully received, sending a negative acknowledgement to the transmitter and receiving, by the receiver, a second MAP message including the second resource allocation information, the second MAP message being transmitted using next available resources reserved for data resource allocation notification; and
receiving, using the resources identified by the second resource allocation information, the second data and the third the resource allocation information mapped to the subsequent time interval.

7. The method of claim 6, wherein the receiver employs a Hybrid Automatic Request (HARQ) scheme when the acknowledgement or the negative acknowledgement is provided to the transmitter.

8. The method of claim 5, wherein the receiver receives the second resource allocation information through the data transmission region, when a value of channel quality information between the transmitter and the receiver is greater than or equal to that of reference channel quality information.

9. A wireless communication system for transmitting resource allocation information comprising:
a transmitter for
transmitting a MAP massage including first resource allocation information mapped to a current time interval, the first resource allocation information identifying resources that the transmitter will use to transmit first data to a receiver during the current time interval through a resource allocation information transmission region,
transmitting the first data and second resource allocation information mapped to a next time interval through a data transmission region, the second resource allocation information identifying resources that the transmitter will use to transmit second data to the receiver through the data transmission region during the next time interval,
determining if an acknowledgment has been received from the receiver, the acknowledgment indicating that the receiver has received the second resource allocation information, and
when the acknowledgement has been received, transmitting, using the resources identified by the second resource allocation information, the second data and third resource allocation information mapped to a subsequent time interval, the third resource allocation information identifying resources that the transmitter will use to transmit third data to the receiver to the subsequent time interval through the data transmission region.

10. The system of claim 9, wherein the transmitter transmits the second resource allocation information through the data transmission region to the receiver when a value of channel quality information between the transmitter and the receiver is greater than or equal to that of reference channel quality information.

11. The system of claim 9, wherein, when the acknowledgement has been not received, the transmitter transmits the second resource allocation information through the data transmission region.

12. The system of claim 9, wherein, when the acknowledgement has not been received, the transmitter transmits a second MAP message including the second resource allocation information of the data transmission region through the resource allocation information transmission region, the second MAP message being transmitted using next available resources reserved for data resource allocation notification, and transmits, using the resources identified by the second resource allocation information, the second data and the third the resource allocation information mapped to the subsequent time interval through the data transmission region.

13. A wireless communication system for receiving resource allocation information, comprising:
a receiver for
receiving a MAP massage including first resource allocation information mapped to a current time interval, the first resource allocation information identifying resources that a transmitter will use to transmit first data to the receiver during the current time interval through a resource allocation information transmission region,
receiving the first data and second resource allocation information mapped to a next time interval through a data transmission region, the second resource allocation information identifying resources that the transmitter will use to transmit second data to the receiver during the next time interval,
determining if the second resource allocation information has been successfully received, and
when the second resource allocation information has been successfully received, sending an acknowledgement to the transmitter, and receiving, using the resources identified by the second resource allocation information, the second data and third resource allocation information mapped to a subsequent time interval, the third resource allocation information identifying resources that the transmitter will use to transmit third data to the receiver in the subsequent time interval.

14. The system claim of 13, wherein when the second resource allocation information has not been successfully received, the receiver sends a negative acknowledgement to the transmitter, receives a second MAP message including the second resource allocation information, the second MAP message being transmitted using next available resources reserved for data resource allocation notification, and receives, using the resources identified by the second resource allocation information, the second data and the third the resource allocation information mapped to the subsequent time interval.

15. The system of claim 14, wherein the receiver employs a Hybrid Automatic Request (HARQ) scheme when the acknowledgement or the negative acknowledgement is provided to the transmitter.

* * * * *